United States Patent [19]

Sethu et al.

[11] Patent Number: 5,453,978
[45] Date of Patent: Sep. 26, 1995

[54] TECHNIQUE FOR ACCOMPLISHING DEADLOCK FREE ROUTING THROUGH A MULTI-STAGE CROSS-POINT PACKET SWITCH

[75] Inventors: Harish Sethu, Kingston; Robert F. Stucke, Saugerties, both of N.Y.; Craig B. Stunkel, Bethel, Conn.

[73] Assignee: International Business Machines Corporation, Armonk, N.Y.

[21] Appl. No.: 222,284

[22] Filed: Apr. 4, 1994

[51] Int. Cl.$^6$ .................................................. H04L 12/56
[52] U.S. Cl. .................................................. 370/60
[58] Field of Search ..................... 370/60, 60.1, 94.1, 370/94.3, 63, 64, 65, 65.5, 66; 395/200, 325; 375/38; 340/825.02, 825.19, 825.8

[56] References Cited

U.S. PATENT DOCUMENTS

| | | | |
|---|---|---|---|
| 4,763,247 | 8/1988 | Borovski et al. | 395/325 |
| 4,766,534 | 8/1988 | DeBenedictis | 395/200 |
| 4,893,303 | 1/1990 | Nakamura | 370/60 |
| 5,157,692 | 10/1992 | Hori et al. | 375/38 |
| 5,189,668 | 2/1993 | Takatori et al. | 370/60 |
| 5,224,100 | 6/1993 | Lee et al. | 370/94.3 |
| 5,260,934 | 11/1993 | Tanaka et al. | 370/60 |

FOREIGN PATENT DOCUMENTS 2091755  3/1990  Japan.

Primary Examiner—Douglas W. Olms
Assistant Examiner—Dang Ton
Attorney, Agent, or Firm—Floyd A. Gonzalez

[57] ABSTRACT

Apparatus and an accompanying method for establishing deadlock-free routing in a large bi-directional multi-stage inter-connected cross-point based packet switch, particularly, though not exclusively, that employed within a high speed packet network of a massively parallel processing system (400). Specifically, in selecting routes for inclusion within route tables (320, 360, 380) contained within the system, the entire network is effectively partitioned such that certain routes would be prohibited in order to isolate packet traffic that would flow solely between nodes in one partition, e.g. system half (503), of the system from packet traffic that would flow between nodes in the other partition, e.g. another system half (507). In that regard, to pick routes for packets that are to transit between nodes situated in a common partition of the system, those routes that contain a path(s) (524, 544) passing through the other system partition would be prohibited. No such route prohibition would occur in selecting a route that is to carry a packet between nodes in multiple system partitions, e.g. between different halves of the system.

20 Claims, 5 Drawing Sheets

5,453,978

TECHNIQUE FOR ACCOMPLISHING DEADLOCK FREE ROUTING THROUGH A MULTI-STAGE CROSS-POINT PACKET SWITCH

BACKGROUND OF THE DISCLOSURE

1. Field of the Invention

The invention relates to apparatus and an accompanying method for establishing deadlock-free routing in a multi-stage inter-connected cross-point based packet switch. This invention is particularly, though not exclusively, suited for incorporation within a high speed packet network used within a massively parallel processing system.

2. Description of the Prior Art

With the continual evolution and commercial availability of increasingly powerful, sophisticated and relatively inexpensive microprocessors, massively parallel processing appears as an increasingly attractive vehicle for handling a wide spectrum of applications, such as, e.g., involving transaction processing, simulation and structural analysis, heretofore processed through conventional mainframe computers.

In a massively parallel processing system, a relatively large number, often in the hundreds or even thousands, of separate, though relatively simple, microprocessor based processing elements is inter-connected through a communications fabric generally formed of a high speed packet network in which each such processing element appears as a separate port on the network. The fabric routes messages, in the form of packets, from any one of these processing elements to any other to provide communication therebetween. Each of these processing elements typically contains a separate microprocessor and its associated support circuitry, the latter being typified by, inter alia, random access memory (RAM) and read only memory (ROM), for temporary and permanent storage, respectively, and input/output (I/O) circuitry. In addition, each processing element also contains a communication sub-system, formed of an appropriate communications interface and other hardware as well as controlling software, that collectively serves to interface that element to the packet network.

Generally, the overall performance of a massively parallel processing system is heavily constrained by the performance of the underlying packet network used therein. In that regard, if the packet network is too slow and particularly to the point of adversely affecting overall system throughput, the resulting degradation may sharply and disadvantageously reduce the attractiveness of using a massively parallel processing system in a given application.

Specifically, in a massively parallel processing system, each processing element executes a pre-defined granular portion of an application. In executing its corresponding application portion, each element generally requires data from, e.g., an application portion executing on a different element and supplies resulting processed data to, e.g., another application portion executing on yet another processing element. Owing to the interdependent nature of the processing among all the elements, each processing element must be able to transfer data to another such element as required by the application portions then executing at each of these elements. Generally, if the processing element, i.e. a "destination" element, requests data from another such element, i.e. a "source" or "originating" element, the destination element remains idle, at least for this particular application portion, until that element receives a packet(s) containing the needed data transmitted by the source element, at which point the destination element once again commences processing this application portion. Not surprisingly, a finite amount of time is required to transport, through the packet network, a packet containing the request from the destination to the source processing elements and, in an opposite direction, a responding packet(s) containing the requested data. This time unavoidably injects a degree of latency into that application portion executing at the destination element. Since most processing elements in the system function as destination elements for application portions executing at corresponding source elements, then, if this communication induced latency is too long, system throughput may noticeably diminish. This, in turn, will significantly and disadvantageously degrade overall system performance. To avoid this, the packet network needs to transport each packet between any two communicating processing elements as quickly as possible in order to reduce this latency. Moreover, given the substantial number of processing elements that is generally used within a typical massively parallel processing system and the concomitant need for any one element in this system to communicate at any one time with any other such element, the network must be able to simultaneously route a relatively large number, i.e. an anticipated peak load, of packets among the processing elements.

Unfortunately, in practice, packet-switched networks that possess the requisite performance, particularly transmission bandwidth, for use in a massively parallel processing system have proven, for a variety of reasons, to be extremely difficult to develop thereby inhibiting, to a certain extent, rapid expansion and increasing use of such systems.

Although widely varying forms of packet networks currently exist in the art, one common architecture uses a multi-stage inter-connected arrangement of relatively small cross-point switches, with each switch typically being an 8-port bi-directional router in which all the ports are internally inter-connected through a cross-point matrix. In such a network, each switch in one stage, beginning at one (i.e. a so-called "input") side of the network, is inter-connected, through a unique corresponding path (typically a byte-wide physical connection), to a switch in the next succeeding stage, and so forth until the last stage is reached at an opposite (i.e. a so-called "output") side of the network. Inasmuch as such a switch is currently available as a relatively inexpensive single integrated circuit (hereinafter referred to as a "switch chip") that, operationally speaking, is non-blocking, use of these switch chips is favored. In fact, one such switch chip implemented as a non-blocking 8-way router, that relies on use of a central queue, is described in co-pending United States patent application entitled: "A Central Shared Queue Based Time Multiplexed Packet Switch with Deadlock Avoidance" by P. Hochschild et al, Ser. No. 08/027,906 still pending; filed Mar. 4, 1993 and which is incorporated by reference herein (and which is commonly assigned to the present assignee hereof).

While such a bi-directional multi-stage packet-switched network is relatively simple, as compared to other packet-switched network topologies, and offers high transmission bandwidth among all its ports, unfortunately this type of network is susceptible to routing deadlocks. These deadlocks, while occurring somewhat infrequently, arise because multiple routes exist between any two switches in the same stage.

In this regard, consider a simple 32-port network of eight such switch chips, organized into two inter-connected stages: a four-switch input stage followed by a four-switch output stage, with all these switch chips contained on a single switch board. With this arrangement, packets transiting between any two ports, on different switch chips, in the input stage would be routed, through a switch chip in the input stage that contains the source ("input") port, to any of four switch chips in the output stage. In turn, this latter switch chip would route the packet back (i.e. reverse its direction) to the switch in the input stage that contains the destination ("output") port for this packet. Inter-switch chip routes are typically pre-defined, during system initialization, in a manner that attempts to balance traffic flow throughout the entire network such that, over a relatively short time, each byte-wise path will carry an approximately equal number of packets. Once these routes are set and other than a switch chip or path failure or maintenance condition, the routes rarely, if ever, change. The assigned routes available to each processing element are then supplied to that element, again during system initialization, in the form of a (local) route table. Subsequently, during routine operation, as each processing element forms a packet, that element, based upon the destination of this packet, reads the route from its route table and simply inserts the route as values of appropriate route bytes in a header of the packet. The packet is then launched into the network and routed through successive switch chips (and switching stages) as specified by the value of corresponding route bytes in the packet. As the packet traverses through a switching stage (i.e. here passes through two switch chips in the same stage), the last switch chip in the stage truncates the corresponding route byte from the packet header.

Routes have traditionally been defined without considering any potential for routing deadlocks. Hence, a routing deadlock can occur whenever corresponding packets, each situated in, e.g., the central queue within a group of different switch chips, are waiting to be simultaneously routed over common paths that connect pairs of switch chips in successive stages. When such a condition occurs, each of these switch chips essentially waits for the others in the group to route their packets over these particular paths. Because none of the packets for this group is able to transit through its associated central queue until any one of the packets for this group is routed, all these packets simply wait and the corresponding paths become deadlocked with no resulting traffic flow thereover. As a result, while the deadlock occurs, the processing elements, to which these packets are destined, also continue to wait for these packets which, in turn, halts their processing throughput. Consequently, the bandwidth of the network skews to favor only those remaining processing elements unaffected by the deadlock which, in turn, can severely imbalance the processing workload and significantly diminish system throughput.

Faced with the problem of avoiding deadlocks, one skilled in the art might first think that some type of global arbitration technique could be used to anticipate a routing deadlock and, in the event, one is expected, select one of a number of non-deadlockable paths over which a packet can be transmitted and thus avoid the deadlock. This technique would require that all packets that are to transit through all the central queues be monitored to detect a potential routing deadlock and then arbitrated accordingly. Unfortunately, the circuitry to accomplish these functions would likely be quite complex and would also need to be located external to all the switch circuits but connected to each of them. This, in turn, increases the size, complexity and hence cost of the packet-switched network. As such, this technique would be quite impractical.

Given this, one might then turn to an alternate technique that involves forming the packet network with duplicated switch boards. Through this technique and when used in connection with a 32-processor system, sixteen ports, illustratively ports 16–31, of one switch board would be connected to the same ports of another switch board. Each of the remaining ports 0–15 on both boards would be connected to a corresponding one of 32 separate processing elements. In operation, packets transiting between source and destination ports connected to a common switch board would be routed solely within that one switch board and would not impinge on any switch chips contained in the other switch board. Only those packets that are to be routed between source and destination ports on different switch boards would be routed between the boards. By isolating packets that only flow in one switch board from potentially interacting with packets that simultaneously flow only in the other switch board, this technique does eliminate deadlocks. Furthermore, this technique does not degrade transmission bandwidth. Unfortunately, by requiring duplicate switch boards and associated circuitry, this technique is costly. Nevertheless, the additional cost of duplicating one switch board and associated circuitry is tolerable in a 32-processor system. As such, this technique is used to avoid deadlocks in a 32-processor system. In fact, a sufficient potential for deadlocks exists in a 32-processor system to rule out forming the packet network with only one switch board. However, this cost penalty simply becomes prohibitive for use in larger systems, such as a 512-processor system, where sixteen additional switch boards would be needed above the sixteen minimally required in the network.

Finally, one might consider use of a technique that avoids routing deadlocks by simply prohibiting certain routes from being used. Through this particular technique, only a specific sub-set of all the routes between two switch chips in the same stage would be defined as being available to carry packet traffic therebetween and thus included within the route tables. Once chosen, these routes would not change, except for again maintenance or failure conditions. The routes that form the sub-set would be specifically chosen such that routing deadlocks would not occur. Inasmuch as network bandwidth degrades as each additional route is prohibited, a goal in using this technique is to prohibit as few routes as possible.

Unfortunately, we have found that when routes are prohibited, the resulting "non-prohibited" routes are not symmetric with respect to all the nodes in the system. As a result, transmission bandwidth is not evenly reduced throughout the entire network thereby causing bandwidth asymmetries throughout the network. As a consequence of these asymmetries, the network tends to develop so-called "hot spots" where transmission bandwidth tends to be very high at certain "hot" ports and becomes essentially zero at others. This, in turn, skews processing throughput to favor those processing elements associated with "hot" ports at the expense of other such ports, and thus unbalances workload processing throughout the network. Degraded system performance results. In fact, when routes are prohibited solely within switch boards, we have failed to find any combination of remaining non-prohibited routes that will result in a constant bandwidth reduction throughout the entire network.

Since the technique of prohibiting routes merely requires selecting certain entries to include in the route table for each processing element, this technique is very simple and highly cost-effective to implement. Thus, this technique would be readily favored for inclusion in a multi-stage cross-point packet network but for its inability to create a symmetric bandwidth reduction across the entire network.

In spite of the attractiveness of using inter-connected bi-directional multi-stage cross-point based networks as the communication backbone of a massively parallel processing system, the increasing potential for deadlocks in these networks and the lack of a practical solution therefor particularly for a large network has, at least up to now, frustrated the commercial availability of massively parallel processing systems, that utilize such networks, much beyond 32 processors, thereby precluding the use of these systems in certain large scale processing applications.

Thus, a need exists in the art for a practical technique that prevents deadlocks from occurring in a large scale bi-directional multi-stage inter-connected cross-point switching network, and particularly, though not exclusively, for use in large scale massively parallel processing systems. Such a technique should be simple to implement, highly cost-effective, and, if network bandwidth is reduced as a result, provide a substantially symmetric and acceptable level of bandwidth reduction across the entire network. We expect that if such a technique were to be included within such a system, these systems, as commercialized, could be readily expanded well beyond 32 processors, such as to 512 separate processors and beyond. Thus, such systems could serve additional application processing needs that would otherwise be precluded.

SUMMARY OF THE INVENTION

Through our present invention, we provide a simple, cost-effective technique, that advantageously overcomes the deficiencies inherent in the art, for preventing routing deadlocks from occurring in large scale bi-directional multi-stage inter-connected cross-point switch based packet networks. Our technique is ideally, though not exclusively, suited for use within such a packet network that forms the communications backbone of a large scale massively parallel processing system.

Specifically, through use of our invention certain pre-defined routes would be prohibited from being considered, during the formation of the route tables, based upon a relative location of the particular nodes in the network, e.g. processing elements, that would otherwise use those routes. The prohibited routes are selected as those which, if not used, would prevent closed loop routing patterns and hence routing deadlocks from arising. In selecting routes for inclusion within the route tables, routes are prohibited in order to isolate packet traffic that would flow solely between nodes in one partition, e.g. half, of the system from packet traffic that would flow between nodes in another partition, e.g. the other system half. In that regard, to pick routes for packets that are to transit between nodes in a common partition of the system, those routes that contain a path(s) (such as a cable(s)) passing through another partition of the system would be prohibited. No such route prohibition would occur in selecting a route that is to carry a packet between nodes in multiple system partitions, e.g. between different halves of the system.

For example, in using 8-by-8 switch circuits (also referred to herein as "switch chips"), a 512-processor system would be constructed with a number of identical 32 port switch boards, organized into two inter-connected stages: node switch boards (NSB) that connect to the individual processing elements and intermediate switch boards (ISB) that are used to inter-connect the node switch boards themselves. Each NSB provides 16 ports to connect to each of 16 different processing elements and another 16 ports to inter-connect to a different port on each of the sixteen ISBs.

To determine which routes are to be prohibited in this system, we effectively consider the system as being divided in half such that sixteen consecutive NSBs (e.g. NSBs 0–15 and NSBs 16–31) and 256 consecutive processing elements would constitute each half. The first eight ISBs would be in one half; the remaining eight ISBs would be in the other half. For a packet that is to transit between processing elements located within a common half of the system, only those available routes, including ISB ports, completely contained within that half of the system would be allowed; all other routes would be prohibited. Hence, any of the latter routes could not be included, during system initialization, within a global route table to connect these processing elements. Alternatively, for a packet that is to transit between processing elements located in different halves of the system, no such routes would be prohibited. Hence, in this case, route selection can be made, for eventual inclusion within the global route table, among all routes that are then available, without any limitation based upon system half.

By isolating each partition, e.g. half, of the system from packet traffic flowing between pairs of processing elements solely internal to any other partition, e.g. the other half, routing deadlocks, that would otherwise arise from interaction of these packets, are advantageously prevented. This, in turn, permits commercializable parallel processing systems to be readily expanded to encompass greater numbers of processing elements and thus serve a wider variety of application processing needs than those heretofore possible.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to various figures.

DETAILED DESCRIPTION

Those skilled in the art readily appreciate that packet networks containing bi-directional multi-stage inter-connected cross-point based packet switches, regardless of their specific application, are susceptible to routing deadlocks of the type addressed described herein. Therefore, after considering the following description, those individuals will clearly realize that the teachings of our present invention can be easily and highly cost-effectively incorporated into nearly any such packet network to prevent these deadlocks from occurring with only a small ensuing reduction in transmission bandwidth. Thus, our invention will find ready use in packet networks, of essentially any size, destined for use across a wide and diverse range of packet switching environments, whether they be for digital communications, such as in a public or private telephone (e.g. local, wide or metropolitan area networks) or other similar network, or in specialized applications, such as the communication backbone of a massively parallel processing system. Nevertheless, to simplify the following description, we will discuss our invention in the context of use within illustratively a massively parallel processing system and particularly within the IBM 9076 SP-1 High Performance Communication Network employed within the SP family of scaleable parallel processing systems currently manufactured by the International Business Machines (IBM) Corporation of Armonk, N.Y. (which owns the registered trademark "IBM" and is also the present assignee hereof).

To enhance reader understanding, we will first discuss various aspects of packet routing in a parallel processing system and particularly pertaining to a bi-directional crosspoint based packet network used therein, then proceed to illustrate a typical routing deadlock situation and finally describe, in detail, our present invention which advantageously prevents these deadlocks from occurring.

Figure 1:
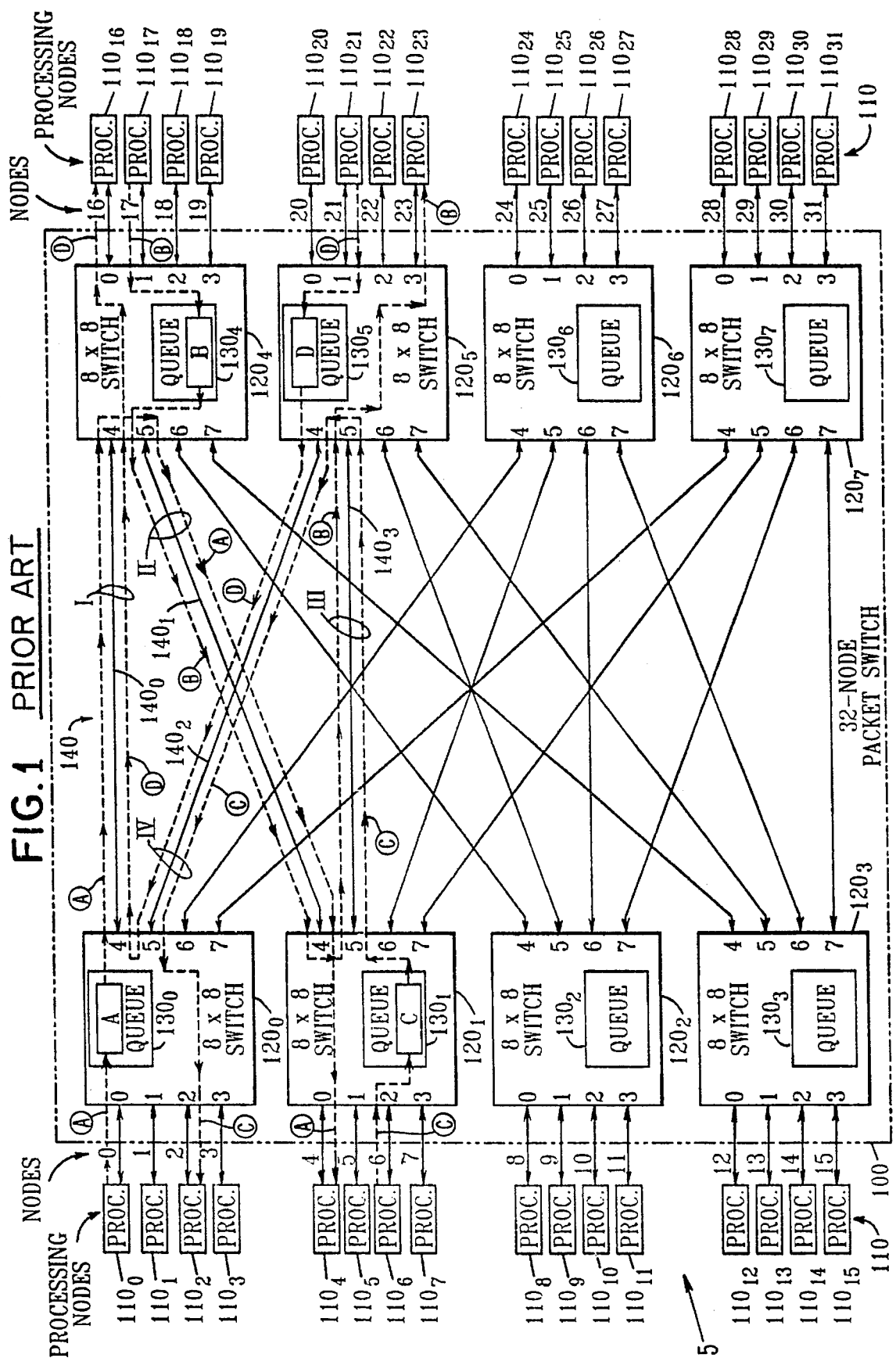
FIG. 1 depicts a high level block diagram of conventional parallel processing system 5 that illustratively utilizes 32 separate processing elements.

First, consider conventional 32-processor parallel processing system 5 shown in FIG. 1. This system contains 32-node packet switch (also referred to herein as "packet network" or simply "network") 100 to which 32 separate, though generally identical, processing elements 110, specifically processing elements $110_0$, $110_1$, . . . , $110_{31}$, are connected to each of 32 nodes, correspondingly numbered from 0 to 31 provided by this network. Each element forms a processing node of the system. The network provides high speed transport of packets from any one of these processing nodes to any other one. The processing elements themselves are each microprocessor based, typically using an RS6000 RISC microprocessor manufactured by the IBM Corporation. Since our present invention has no bearing on the architecture or circuitry of any of these elements, these aspects, which will be readily apparent to anyone skilled in the art, will not be discussed in any detail herein. Nevertheless, our present invention, as discussed in great detail below, is embodied within system initialization software executed within one of these processing elements and route tables stored within each of these elements. Therefore, these particular aspects will be specifically discussed hereinbelow.

As shown, network 100 is configured using eight separate 8-by-8 bi-directional switch circuits 120 organized into two inter-connected stages: an "input" stage containing four switch circuits $120_0$, $120_1$, $120_2$ and $120_3$ and an "output" stage containing four switch circuits $120_4$, $120_5$, $120_6$ and $120_7$. The designation "input" and "output" are purely arbitrary for purposes of discussion; in actuality, any stage or port on the network can serve as either an input or output stage or port. Each of these switch circuits is preferably a central queue based non-blocking 8-way router, particularly that described in co-pending United States patent application entitled: "A Central Shared Queue Based Time Multiplexed Packet Switch with Deadlock Avoidance" by P. Hochschild et al, Ser. No. 08/027,906; filed Mar. 4, 1993 (the "Hochschild et al" application) and which is incorporated by reference herein. Because each switch circuit is advantageously integrated as a single integrated circuit, i.e., a so-called "chip" then for clarity, we will refer to each such switch circuit itself as a "switch chip". Of course, those skilled in the art realize that each switch circuit need not be implemented solely as a single chip. In any event, inasmuch as the switch chip itself does not form part of the present invention, it will not be discussed in any detail, with the reader being directed to the Hochschild et al application for all further details on this circuit. As depicted, each of the switch chips contains a central queue, illustratively queues $130_0$, $130_1$, $130_2$, . . . , $130_7$ situated within corresponding switch circuits $120_0$, $120_1$, $120_2$, . . . , $120_7$. In essence and to the extent relevant here, the purpose of each central queue is to provide an alternate route through the corresponding switch circuit to, inter alia, ameliorate input blockage and deadlocks, the latter being caused by input ports (specifically the FIFO buffers therein) and queues filled with opposing traffic—a different form of deadlock than that to which the present invention is directed.

The input and output stages of the network are interconnected through connection matrix 140, with each of these connections being essentially a byte-wide physical link (cable), of which illustrative links $140_0$, $140_1$, $140_2$ and $140_3$ are specifically numbered. Through this matrix, a port on each one of the switch chips in the input stage is separately and physically connected to a corresponding port of every one of the switch chips in the output stage. For example, switch chip $120_0$, which provides ports 0–7, is connected through its ports 4, 5, 6 and 7, via corresponding cables, to port 4 on each of switch chips $120_4$, $120_5$, $120_6$ and $120_7$ all in the output stage. Packet switch 100, containing the eight switch chips and connection matrix 140, collectively comprise a single switch board. Ports 0–3 of each switch chip are connected to links external to the switch board; while ports 4–7 of each such chip are connected to links (cables) within connection matrix 140 and hence, therethrough, to a port of another such switch chip within the same board.

In order for processing elements to communicate with each other, such as for one element to request data from another element or to supply data thereto, a "source" processing element, based on an application portion it is executing, fabricates a packet containing an appropriate message, with either instructions and/or data, and transmits that packet into packet switch 100 for transport to a "destination" processing element. The destination element then processes the data and/or instructions contained in the packet and produces an appropriate response which, in turn, based on the application portion executing at the destination processing element, is fabricated into another packet and, e.g., transmitted back into the network for transport to either the source or a different processing element for further processing, and so forth.

To facilitate packet transport through the network, each packet contains a header with specific routing instructions in the form of route bytes. As described below, all routes are pre-defined. Once a source processing element determines the destination for a given packet it is assembling, that element merely accesses its internal (local) route table, with the destination processing element as an address, and reads the route thereto in the form of values of the appropriate route bytes. These values are simply inserted, as the route bytes, into the header of the packet.

Figure 2:
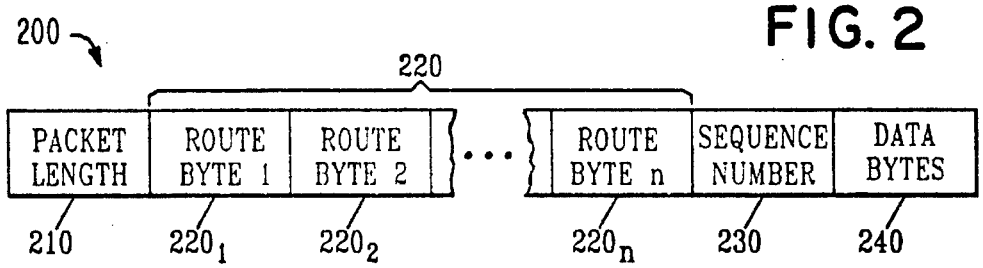
FIG. 2 depicts illustrative packet 300 that transits through system 5, shown in FIG. 1, and its constituent fields.

FIG. 2 shows the organization of a typical packet, i.e. packet 200, which is transported through the packet network. Individual packets may be as long as 255 bytes. As shown, packet 200 contains a succession of fields: length field 210; route field 220 which itself contains route bytes $220_1, 220_2, \ldots, 220_n$; sequence number field 230; and data field 240. Length field 210 contains an 8-bit value which specifies the length of the packet in bytes. Route field 220 contains several bytes, specifically route bytes $220_1, 220_2, \ldots, 220_n$, which collectively specify a particular and singular route (path) which the packet is to follow through the entire network from its source node to its destination node. Field 230 holds a sequence number provided by the source processing element. This number, assigned by the source processing element for this packet and used by the destination processing element, identifies the order of the packet in a given sequence. As such, this number can be used as a check to prevent destination processing of out-of-sequence packets. Data field 240 contains a succession of bytes that collectively form the data (which may contain actual data and/or instructions) being carried by the packet to a destination processing node. Fields 210, 220 and 230 collectively form a packet header.

The number (n) of route bytes that appears within routing field 220 is determined by the number of switching stages through which the packet will transit. In that regard, each route byte holds routing instructions for two successive switch chips. Hence, if the packet is only to transit through two switch chips in two successive stages, such as shown in FIG. 1, in the network to reach the destination processing node, field 220 only contains route byte $220_1$, and so forth, in a larger network, for additional pair of switch chips used therein. All the route bytes have the same format. In this regard, a route byte (R[7:0]) consists of a 1-bit field selector (R[7]—not specifically shown) and two 3-bit route fields (R[6:4] and R[2:0]—both of which are also not specifically shown). If the value of bit R[7] is zero, then a switch chip routes the packet to an output port on that chip specified by the binary value of bits R[6:4] and then sets the value of bit R[7] to one. Alternatively, if the value of bit R[7] is one, then the switch chip routes the packet to the output port on that chip specified in bits R[2:0] and, while doing so, discards this entire route byte; thus parsing the route byte from the packet. Hence, each route byte provides routing instructions for two successive switch chips. By concatenating n route bytes into route field 220, each packet can be routed through up to 2n stages of switch chips.

Collectively speaking, a switch chip that receives a packet examines the first route byte then existing in that packet and routes the packet to the port indicated by that byte. In the course of doing so, every alternate switch chip in the path of the packet truncates (removes) that entire route byte from the packet. This, in turn, makes the next successive route byte in route field 220 the first route byte for the next switch chip and switching stage. Upon arriving at the destination processing node, the packet will contain no route bytes. Each switch chip is oblivious to any additional route bytes beyond the first byte then carried by the packet and upon which that circuit conducts its specific routing. Furthermore, each switch chip does not distinguish between any route bytes other the first route byte and any following data bytes.

As noted above, routing is accomplished, during packet assembly, by first inserting pre-defined route bytes into a packet header with subsequently actual routing of the packet being conducted and dictated, within the network independent of the source and destination processing elements, by the specific value of each of those bytes.

Figure 3:
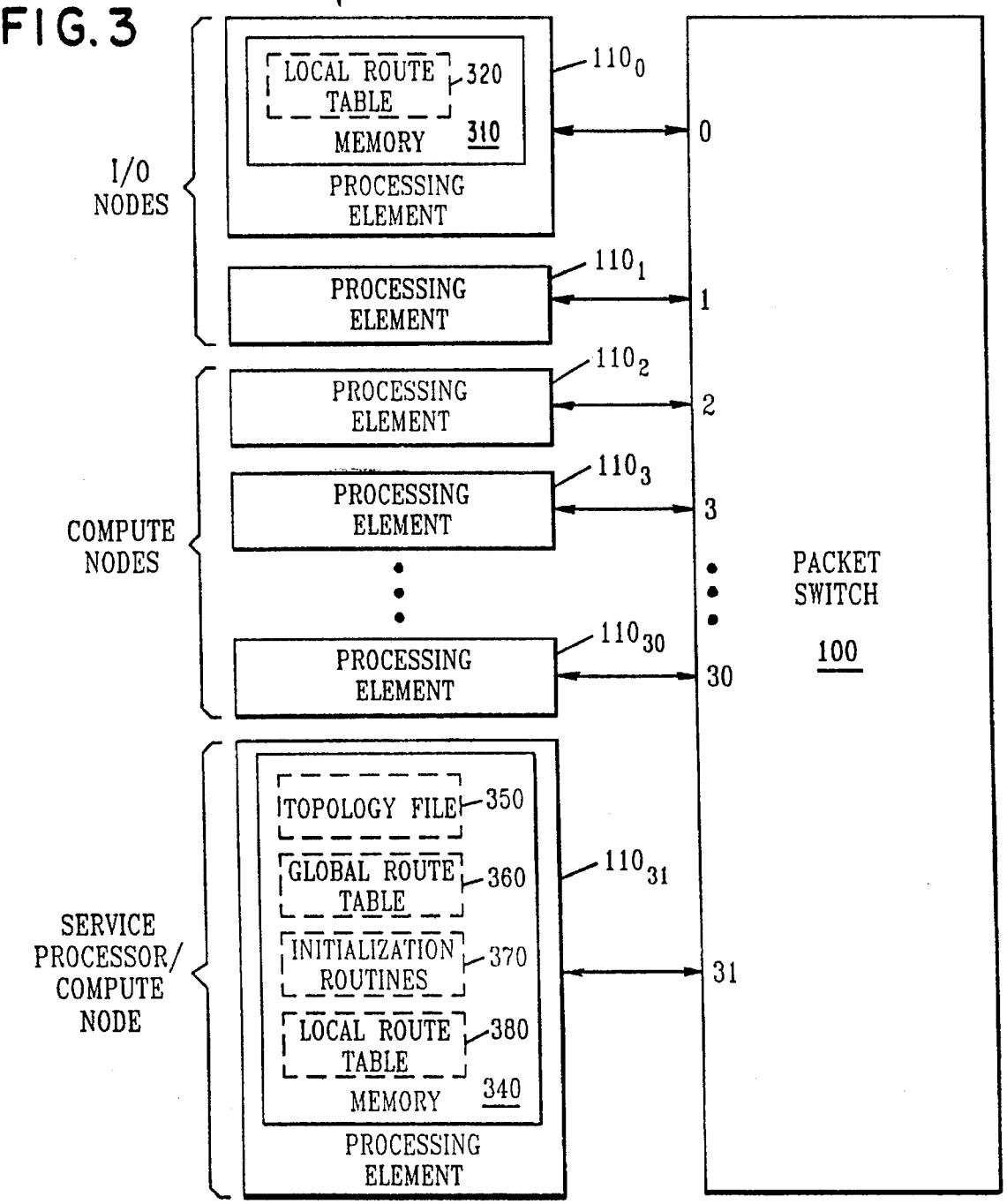
FIG. 3 depicts processing nodes 110 that comprise system 5, shown in FIG. 1, and specifically various files and tables resident in memory within these nodes to accomplish packet routing.

FIG. 3 depicts processing nodes 110 that comprise system 5, shown in FIG. 1, and specifically the various files and tables resident in memory within these nodes to accomplish packet routing. Packet switch (network) 100 functions in two modes, time multiplexed together: a run phase, during which the switch circuits simply route incoming packets, and a service phase, during which the processors are initialized and/or the network is monitored and managed on a circuit-switched basis. All devices attached to the network transfer between modes on a synchronized lock-step basis. During the run phase, certain processing elements may be relegated to certain tasks. For example, processing elements $110_0$ and $110_1$ may be dedicated as input/output (I/O) nodes in order to provide links from system 5 to other networks or processing systems and thus transfer information therebetween. Other processing elements, such as illustratively elements $110_2, 110_3, \ldots, 110_{31}$ may all be used as compute nodes for actual application processing. One of the processing elements, such as processing element $110_{31}$, is used as a service processor to undertake various network operations during the service phase. If desired, during the run phase, the service processor can also function as a compute node. Though the service processor is identical, from a hardware standpoint, with all the other processing elements, the service processor contains, within its memory (here memory 340), and executes additional software, inter alia initialization routines 370, that execute during the service phase. For example, this phase provides: initialization, communication link synchronization, global time synchronization, fault determination and isolation and various diagnostic services to all the switch circuits and all other devices, including all other processing elements, connected to the network. Since the initialization function is the only portion of the service phase relevant here, only this portion of the service phase will be discussed hereinbelow and particularly only those aspects pertinent to packet routing and our present invention. The initialization phase is undertaken before the system undertakes any application processing.

Service processor $110_{31}$ stores, within its memory 340, a database, specifically topology file 350, of structured entries that collectively define each and every device, including (though not limited to) all the processing elements, that are connected to the network and the specific bi-directional physical connections (cables) used in the network to link these devices. The manner through which the database is created is not relevant here and thus will not be discussed. Within the topology file, the maximum numbers of switch circuits and other devices are identified first, by a device entry, followed thereafter by an entry of each physical connection that exists between any of these circuits and the devices. A device entry contains two numeric fields and is of the form: "number of devices ($n_v$); number of switch circuits ($n_s$)". Given these values, device identification (id) numbering is then assumed to be in the range from 0 to $n_v$ and switch circuit id numbering from 0 to $n_s$. For a network containing a maximum of 16 devices and 8 switch circuits, the device entry would simply be "16 8". Each connection entry has six fields and is the form of: "device 1-type; device 1-id; device 1-port; device 2-type; device 2-id; device 2-port". Device-type information specifies the nature of the device, i.e. whether that device is a processing element, if so, whether that element is the service processor, or whether that element is a switch circuit. An illustrative connection entry might be "tb0 14 0 s 3 6" which indicates that "a processing element labeled with id 14 is connected in full-duplex fashion from its port 0 to both input and output port 6 on switch circuit 3". The wiring of the network is usually quite regular, well defined and symmetric. However, in actuality, some of the switch boards may be powered down for maintenance or other network components, such as cables, switch circuits (specifically the switch chips used therein) or processing elements, intentionally isolated as a result of a failure condition. Hence, the resulting network topology at any one time may be quite irregular.

In any event, during initialization and specifically execution of initialization routines 370, service processor $110^{31}$ reads topology file 350, as it then exists, and then physically determines, through broadcasting test messages and receiving corresponding responses thereto, the status of each connection in the network as well as of each device connected thereto. Based upon these responses, the service processor determines, using, e.g., a well-known breadth-first search, all the available routes that can be used to connect each (source) node of the network to every other (destination) node of the network. Given the path redundancies inherent in the bi-directional multi-stage cross-point network, several routes, through different switch circuits in different switch stages, often exist to connect a pair of source and destination nodes. In view of multiple routes between each common pair of source and destination nodes, the service processor then selects one of these routes for each of these pairs of nodes and stores that route in global route table 360 within memory 340. These routes are selected primarily on a shortest-path basis consistent with achieving, over a unit time, a substantially uniform distribution of packet traffic throughout the network in order to avoid traffic congestion and hot-spots in the network.

Once global route table 360 has been fully constructed to define a path between each pair of available source and destination nodes of network 100, service processor $110_{31}$ then provides, through the network, a corresponding portion of that table to each of the individual processing elements, including itself, for storage thereat as a local route table. That portion contains only those routes which list that particular processing element as the source node. Thus, for example, processing element $110_0$ stores, within its memory 310, local route table 320; and service processor $110_{31}$ stores, within its memory 340, local route table 380, and so forth for each of the other processing elements. During packet formation, as noted above, each processing element merely accesses its local route table, and, based upon the destination of the packet then being assembled, copies the values of the routing bytes for that destination from the table into the header for that packet.

Now, with the above in mind, let us return to FIG. 1 to illustrate a routing deadlock.

A routing deadlock can occur whenever corresponding packets, each situated in, e.g., the central queue within different switching stages of switch chips, are waiting to be simultaneously routed over common paths that connect pairs of switch chips in successive stages. Therefore, assume, for the moment, that a packet, denoted as "A", resides in central queue $130_0$ of switch chip $120_0$ and is awaiting to be routed from processing node $110_0$, over a dashed line path identified with a circled "A", to processing node $110_4$. Through this path, packet "A" would be directed by switch chip $120_0$, over cable $140_0$, to port 4 of switch chip $120_4$, and then be routed back, via port 5 of this latter chip and cable $140_1$, to the input stage, and specifically port 0 of switch chip $120_1$ which connects to processing node $110_4$. Similarly, assume that, simultaneously with packet "A" residing in queue $130_0$, three other packets, labeled "B", "C" and "D", reside in central queues $130_4$, $130_1$ and $130_5$ within switch chips $120_4$, $120_1$ and $120_5$, respectively. Packet "B" is to be routed from processing element $110_{17}$, connected to node 1 of switch chip $120_4$, via a dashed line path labeled with a circled "B", to processing element $110_{23}$ connected to node 3 of switch chip $120_5$. Similarly, packet "C" is to be routed from processing element $110_6$, connected to node 2 of switch chip $120_1$, via a dashed line path labeled with a circled "C", to processing element $110_2$ connected to node 2 of switch chip $120_0$. Likewise, packet "D" is to be routed from processing element $110_{21}$, connected to node 1 of switch chip $120_5$, via a dashed line path labeled with a circled "D", to processing element $110_{16}$ connected to node 0 of switch chip $120_4$.

As shown, all four packets have routes that will simultaneously conflict and take them over the same set of four cables, with each route sharing its cables with two other routes. Consequently, each of switch chips $120_0$, $120_1$, $120_4$, and $120_5$ will wait, with these packets residing in their corresponding central queues, for any other one of these switch chips to route its packet first. Inasmuch as each of the packets will basically reverse its direction, i.e. "turn around", in one of the switch chips (though through different ports therein), the routes to be taken by all these packets would collectively form a closed loop pattern (indicated by numerals I–II–III–IV and referred to herein as a "cycle"). Because the switch chips are simply incapable of determining which of these particular packets to route first, all of the switch chips will just wait and none of the packets will be routed. As such, each of the four packets in the cycle will block the remaining three. Consequently, a routing deadlock occurs. While this deadlock persists, the corresponding path carries no packet traffic. Hence, processing elements $110_4$, $110_{23}$, $110_2$ and $110_{16}$, in merely waiting for their packets to arrive, effectively suspend processing of those application portions which require these packets. This, in turn, disadvantageously reduces the processing throughput of system 5. Once a routing deadlock occurs, it lasts indefinitely until it is cleared in some fashion. Although routing deadlocks happen relatively rarely, as the size of a parallel processing system increases, the potential for these deadlocks to occur also increases.

In view of this phenomena, we have invented a technique for preventing routing deadlocks from occurring in relatively large scale massively parallel processing systems. Advantageously, our technique is very simple and highly cost-effective to implement and only exacts a rather modest, and quite acceptable, reduction in transmission bandwidth through the packet network.

Through our inventive technique, certain pre-defined routes would be prohibited from being considered, during formation of the global route table, based upon a relative location of the particular processing elements (network nodes) that would otherwise use those routes. The prohibited routes are selected as those which, if not used, would prevent closed loop routing patterns and hence routing deadlocks from arising. In selecting routes for inclusion within the route tables, routes are prohibited in order to isolate packet traffic that would flow solely between nodes in one partition, e.g. half, of the system from packet traffic that would flow between nodes in another partition, e.g. the other system half. In that regard, in picking routes for packets that are to transit between nodes in a common partition of the system, those routes that contain a path(s) (such as a cable(s)) passing through another partition of the system would be prohibited. No such route prohibition would occur in selecting a route that is to carry a packet between nodes in multiple system partitions, e.g. in multiple halves of the system. By isolating each partition, e.g. half, of the system from packet traffic flowing between pairs of processing elements solely internal to any other partition, e.g. the other half, routing deadlocks, that might otherwise arise from interaction of these packets, are advantageously prevented.

To provide the necessary inter-processor routing capability in a relatively large massively parallel processing system, such as one utilizing 512 separate processing elements, the system uses a number of switch boards, each identical to that described above, organized into two inter-connected stages of switch boards: node switch boards (NSB), in one such stage, that connect to the individual processing elements and intermediate switch boards (ISB), in another such stage, that are used to inter-connect the node switch boards. A 512-processor system typically employs 48 separate switch boards with 32 such boards dedicated as NSBs and 16 remaining boards dedicated as ISBs. Each NSB provides 16 ports to connect to each of 16 different processing elements and another 16 ports to inter-connect to a different port on each of the sixteen ISBs. With this arrangement, the NSBs route packets from and to individual processing elements connected thereto and the ISBs route packets between different NSBs, with all entire route routing specified, as described above, by routing bytes contained in the packet headers.

Figure 4:
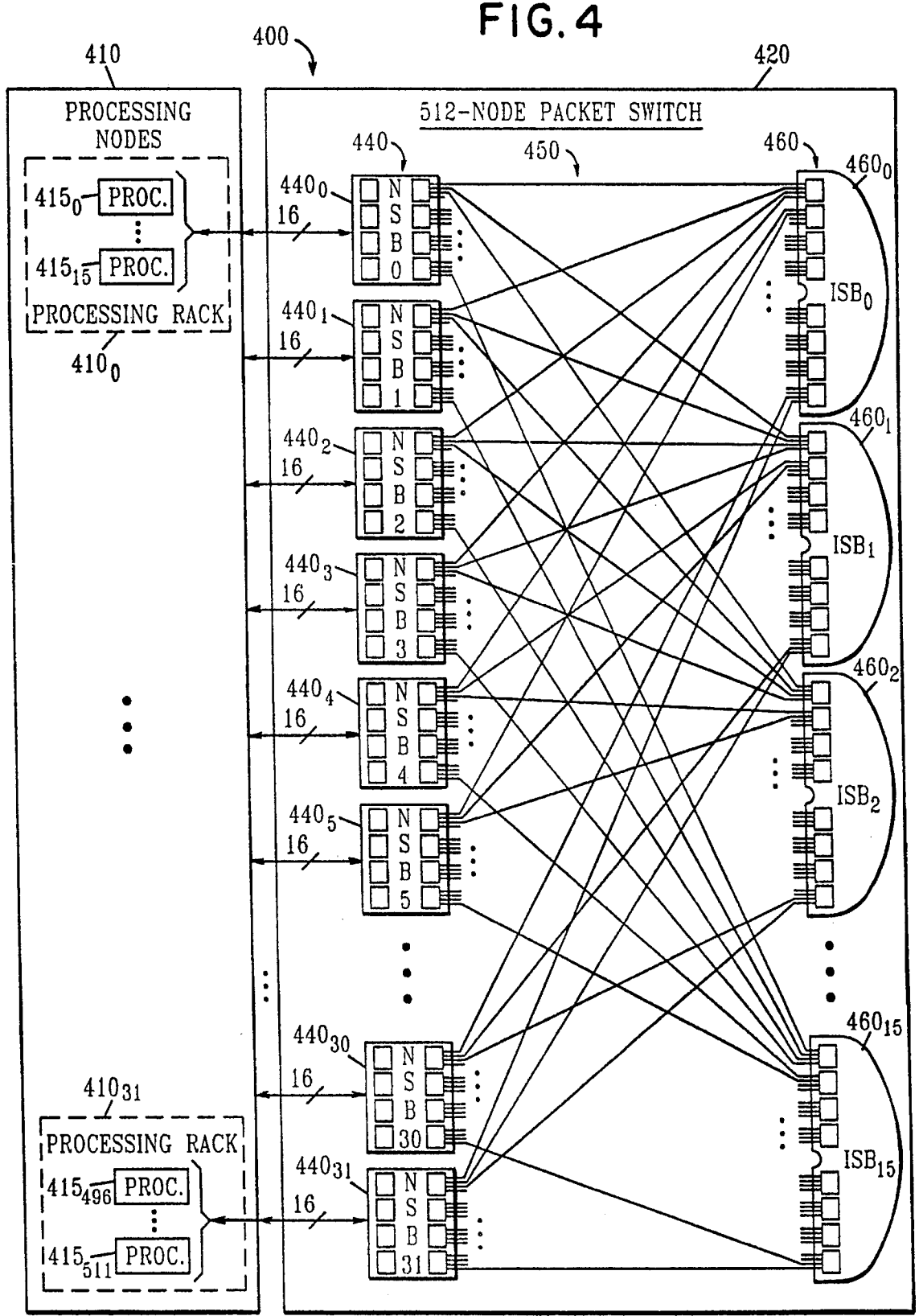
FIG. 4 depicts a high level block diagram of parallel processing system 400 that contains illustratively 512 processing elements and utilizes the teachings of our present invention.

An illustrative 512-processor system is depicted as system 400 in FIG. 4. As shown, this system provides 512 different processing elements $415_0, \ldots, 415_{15}, \ldots 415_{496}, \ldots 415_{511}$, collectively shown as processing nodes 410 and organized, from a physical standpoint, into 32 physical racks of 16 processing elements each, specifically processing racks $410_0, \ldots 410_{31}$. Each rack is, in turn, connected to sixteen ports of a respective NSB. System 400 contains 32 NSBs $440_0, 440_1, 440_2, 440_3, 440_4, 440_5, \ldots, 440_{30}$ and $440_{31}$ (also designated as NSB 0, NSB 1 and so forth). The remaining sixteen ports of each NSB are inter-connected, through individual cables in connection matrix 450, to a corresponding port on each one of the sixteen ISBs 460, specifically ISBs $460_0, 460_1, 460_2, \ldots, 460_{15}$ (also designated as ISB 0, ISB 1 and so forth). As such, for example and as shown, each one of sixteen ports on NSB $440_0$ (NSB 0) is connected to port 0 on a different corresponding one of the sixteen ISBs, such that NSB $440_0$ can route a packet to each of the ISBs. The other NSBs are inter-connected, as shown, in a similar fashion to every one of the ISBs. Although all the switch boards, whether an ISB or an NSB, are identical to each other, the ISBs are shown in a manner, different from the NSBs, that facilitates easy depiction of connection matrix 450.

In system 400, as well as other large scale massively parallel processing systems that rely on using intermediate switch boards (or the like), we recognized that routing deadlocks can occur, in the absence of using our invention, because a packet, when routed between different NSBs, reverses its direction within an ISB, in much the same fashion as packets "A" and "C" reverse their direction (are "turned around") within switches $120_4$ and $120_5$ in system 5 shown in FIG. 1. Since packets do not originate within an ISB, as shown in FIG. 4, but are merely routed therethrough between separate NSBs, closed loop routing patterns, if they were to arise, would of necessity extend to the ISBs and not be limited to exist solely within an NSB. As such, a routing deadlock in system 400 will not be confined to just any one or more of the NSBs themselves.

Figure 5:
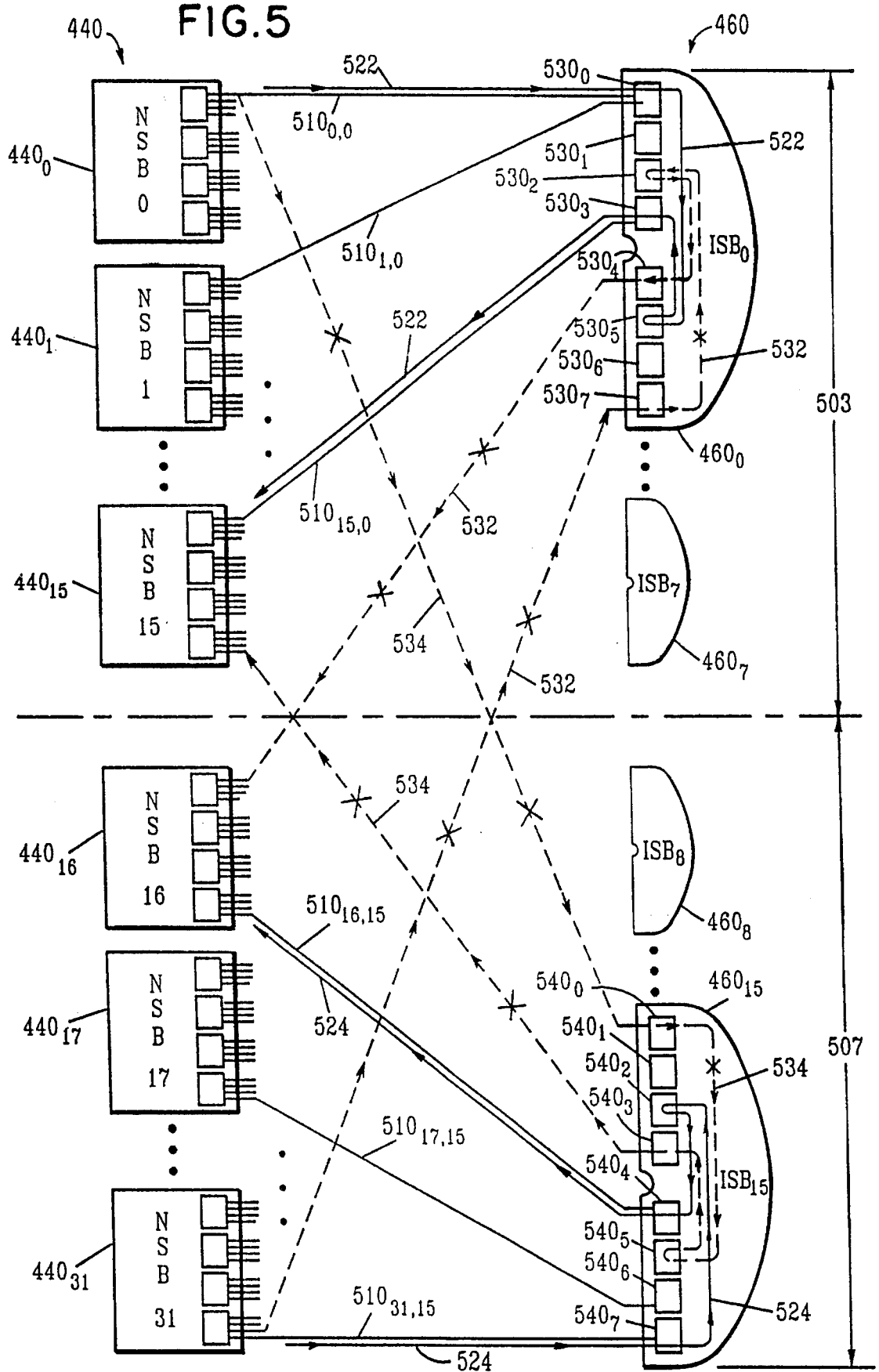
FIG. 5 depicts the intermediate switch boards (ISBs) situated within system 400 and their inter-connected node switch boards (NSBs) with illustrative packet routes determined in accordance with our inventive teachings.

In accordance with our present inventive teachings, to determine which routes are to be prohibited, we effectively partition system 400 illustratively in half. In this case, sixteen consecutive NSBs (e.g. NSBs 0–15 and NSBs 16–31) and 256 consecutive processing elements e.g. (respectively elements $415_0, \ldots, 415_{255}$ and $415_{256}, \ldots, 415_{511}$) would be allocated to each half. Also, the first eight ISBs would be in one half; the remaining eight ISBs would be in the other half. In this regard, consider FIG. 5 which shows ISBs 460 along with all the NSBs that comprise system 400 shown in FIG. 4. As shown, the system is partitioned into halves 503 and 507. A common port, such as port 0 (not specifically labeled), on each of the 32 NSBs is connected, through a separate corresponding path (cable) to a corresponding one of 32 ports on a single ISB, and so forth for each of the remaining ports on all the NSBs and other ISBs. System half 503 encompasses NSBs $4400$ through $440_{15}$ and ISBs $460_0$ through $460_7$. Here, NSBs $440_0$ through $440_{15}$ are shown as connected, through paths (cables) $510_{0,0}, 510_{1,0}, \ldots, 510_{15,0}$ to sixteen consecutive ports (of which only three are specifically shown) of a single ISB, here ISB $460_0$ and particularly switch chips $530_0$ through $530_3$ therein. Remaining system half 507 encompasses NSBs $440_{17}$ through $440_{31}$ and ISBs $460_8$ through $460_{15}$. Similarly, these particular NSBs are shown as connected through paths $510_{16,15}, 510_{17,15}, \ldots, 510_{31,15}$ to corresponding ports of a single ISB, here ISB $460_{15}$ and particularly switch chips $540_4$ through $540_7$ therein.

For a packet that is to transit between processing elements located within a common half of the system, such as half 503, only those available routes, including ISBs, completely contained within that half of the system would be allowed (such as illustratively route 522 between NSBs $440_0$ and $440_{15}$, and route 524 between NSBs $440_{31}$ and $440_{16}$); all other routes (such as dashed-line route 534 between NSBs $440_0$ and $440_{15}$ and dashed-line route 532 between NSBs $440_{31}$ and $440_{16}$) would be prohibited. Hence, any of the latter routes could not be included, during system initialization, within the global route table to connect these processing elements. A prohibited route is also indicated by an "X" through the route. Alternatively, for a packet that is to transit between processing elements located in different halves of the system, no such routes would be prohibited. Hence, in this case, route selection can be made, for eventual inclusion within the global route table, among all routes (including one, (not specifically shown) between NSBs $440_0$ and $440_{16}$, that are then available, without any limitation based upon system half.

Route prohibition is carried out through processing a specific routing directive, as described below, while the global route table is being generated. This processing excludes all prohibited routes from being selected as the defined route between a given pair of network nodes.

By isolating each half of the system for packet traffic that is to occur between its own internal processing elements and thereby eliminating any interaction of these packets with packets transiting between processing elements contained in the other half, routing deadlock can be advantageously prevented.

Surprisingly, we have found through extensive numerical analysis of a 512-port switching network, as described above, with expected traffic patterns therethrough, that use of our inventive technique diminishes the maximum transmission bandwidth through the network by only a modest amount. In this regard, use of our invention advantageously preserves approximately 74% of the maximum bandwidth otherwise available in the network, which is much higher than approximately 50% that we would have expected. Therefore, the penalty assessed through use of our inventive technique to avoid routing deadlocks is quite acceptable particularly in view of the advantages gained thereby.

Figure 6:
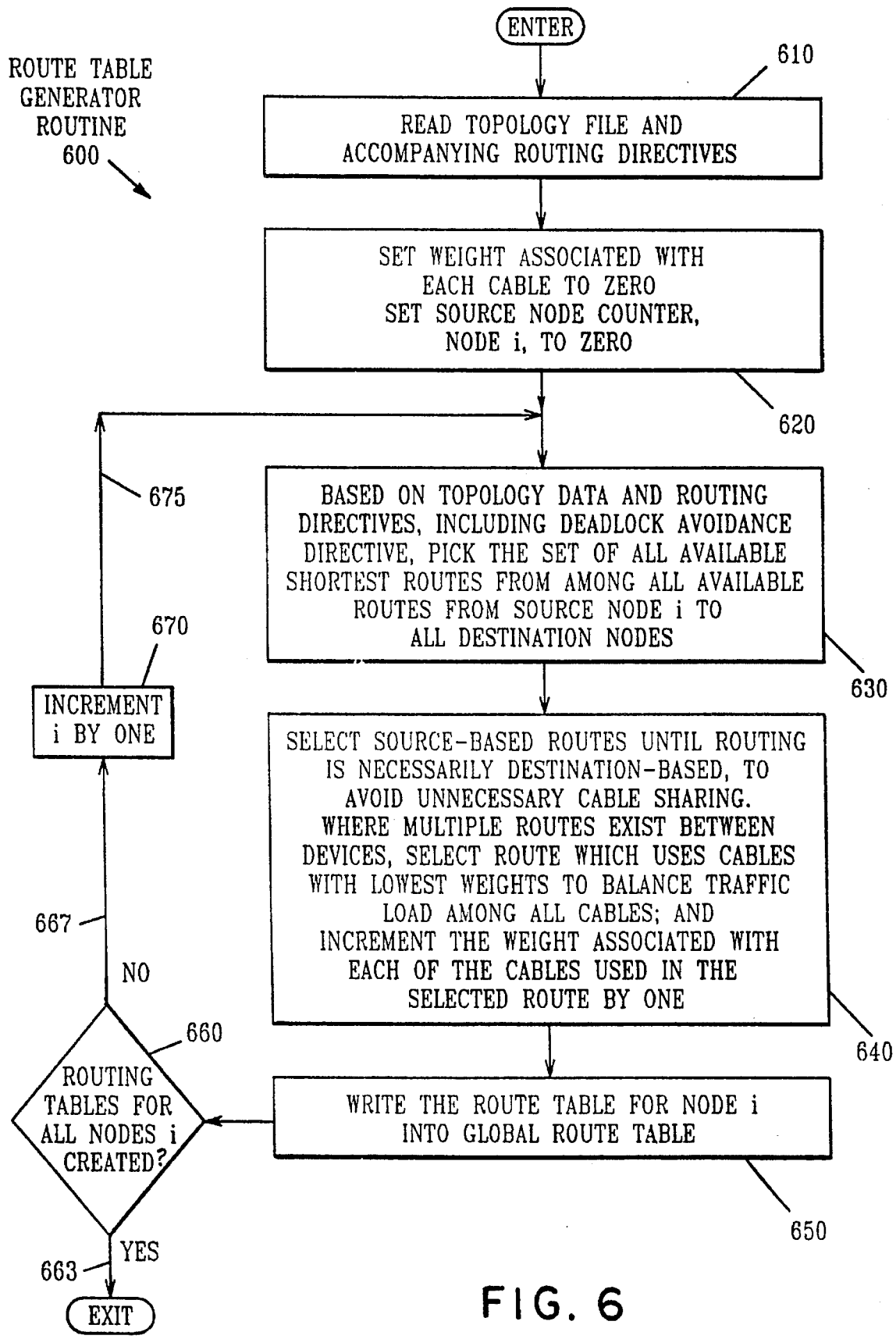
FIG. 6 depicts a high level flowchart of Route Table Generator routine 600 that is executed within a service processor, illustratively processing element $415_{511}$, situated within system 400 shown in FIG. 4 in order to define packet routes in accordance with our inventive teachings.

With the above in mind, FIG. 6 depicts a high level flowchart of Route Table Generator routine 600 that is executed within a service processor, illustratively processing element $415_{511}$, situated within system 400 shown in FIG. 4 in order to define packet routes in accordance with our inventive teachings. Routine 600 is part of the initialization routines which, as discussed above, execute within the service processor.

Upon entry into routine 600, as shown in FIG. 6, execution first proceeds to block 610 which, when executed, reads the topology file and the accompanying routing directives. To provide deadlock avoidance routing, an appropriate directive must be included into the topology file for each device in the packet network, e.g. a switch circuit (or specifically a switch chip used therein), indicating whether routing through that device is to be restricted or not, i.e. whether a packet can reverse direction through this circuit. Consider a switch board, such as that shown in FIG. 1 which embodies network 100. As noted above, ports 0–3 of each switch chip are connected to links external to the switch board; while ports 4–7 of each switch chip are connected to links (cables) within connection matrix 140 and, therethrough, to a port of another switch chip in the same board. A routing directive "nr" specified, in the topology file, against a particular switch chip signifies that there are no routing restrictions with respect to that chip. As such, a packet can enter this chip on any of its eight ports and leave the chip on any other port; in this instance, the packet can reverse its direction ("turn around") within the chip. Alternatively, if a routing directive "n-i-t" exists in the topology file against the switch chip, then a packet entering on either ports 4–7 would be constrained to be routed to and exit from chip only on any of ports 0–3; that packet would be prohibited from reversing its direction within the chip. However, an "n-i-t" directive would not restrict packets arriving on any of ports 0–3 of the switch chip, which can be routed to any other port on that chip. A sample line in the topology file with a deadlock avoidance directive is:

aux routing n-i-t 330 331 332 333 where:

"aux routing" signifies an auxiliary line with a routing directive; and

"330 331 332 333" are numeric identifiers for certain switch circuits in the format used within the topology file.

Once block 610 fully executes, execution proceeds to block 620 which sets the weight associated with each cable (link) specified in the topology file to zero. In addition, a source node counter, node i, is initialized to zero. Thereafter, execution passes to block 630. This particular block, utilizing the data contained in the topology file together with the accompanying deadlock avoidance routing directives, picks a set of available routes, through the packet network, to connect a current source node (node i) with every destination node within the system. The routes are chosen, through a well-known breadth-first search, to be those with the shortest lengths, i.e. those having the fewest individual links (cables) and not necessarily those with the shortest physical length. A pseudo-code representation of deadlock avoidance route selection, as described above and pertaining just to each switch circuit, is as follows:

```
case of routing_directive is
{
"nr": total_permissible_oports=8;
            /*all output ports on the switch chip*/
"n-i-t": if(input_port<4)
            total_permissible_oports=8;
         else
            total_permissible_oports=4;
}
i=0;
while(i<total_permissible_oports) do
   {
   permissible_oport[i]=i
   i=i+1
   }
```

Selection of the set of shortest-path routes is occurs on a source-based basis, as indicated in block 640, until routes are extended from the current source node to all destination nodes, i.e. when the routes become destination-based. If only one shortest length route results from the source node to a destination node, that route is selected for use therebetween. Alternatively, in those instances, where multiple such routes result between this source node and a common destination node, the one selected route is the one having cables with collectively the lowest weight. Through weight based selection, the traffic load can be balanced, with minimal cable sharing, throughout the entire packet network. Once a particular route is selected between the source node and a destination node, the weight associated with each cable in that route is incremented by one. Though blocks 630 and 640 are shown as distinct blocks to enhance understanding, the operations are generally combined together.

Once all the routes have been selected for all the destination nodes, then execution proceeds to block 650 which executes to write all the selected routes into the global route table, thereby forming a route table for the current source node. Thereafter, execution passes to decision block 660 to determine whether a route table has been written, into the global route table, for every node in the network. If route tables have not been written for every node, decision block 660 routes execution, via NO path 667, to block 670. This latter block, when executed, increments source node counter i by one. Execution then loops back, via path 675, to block 630 to determine and write routes for the next successive node, and so forth. Alternatively, if route tables have been written for all the nodes, then execution exits from routine 600, via YES path 663, emanating from decision block 660. Subsequent to the execution of this routine and prior to the completion of initialization process, the service processor, as discussed above, will provide (specifically copy), through the network, a corresponding portion of the global route table to each and every one of the individual processing elements, including itself, for storage and subsequent use thereat as a local route table. That portion contains only those selected routes for which that particular processing element is a source node.

By now those skilled in the art will realize that although we described our inventive technique in the context of use with a massively parallel processing system that utilizes 512 separate processing elements, our invention is not so limited. In fact, our invention can be applied to eliminate routing deadlocks in substantially any size parallel processing system that utilizes a bi-directional multi-stage inter-connected cross-point based packet network. In that regard, our invention can be readily incorporated into a 64-processor system, a 256-processor system and similar systems of other sizes, as well as in other systems that utilize multi-stage inter-connected cross-point packet networks regardless of their end use.

Furthermore, although our inventive teachings are discussed in the context of partitioning a packet network into two separate halves and, with limited routing therebetween, such a network can be divided, through use of our invention, into any number of separate partitions to isolate packet traffic flowing solely in each of these partitions. Of course, as the number of partitions increases, so will the number of prohibited routes needed to achieve the partitioning. Unfortunately, as the number of prohibited routes increase, fewer available routes will remain to carry packet traffic; thus, transmission bandwidth through the network will decrease. We have found that two partitions provides an excellent tradeoff in terms of the packet isolation and deadlock avoidance achieved in view of the modest bandwidth reduction that results.

Although a single preferred embodiment which incorporates the teachings of the present invention has been shown and described in detail herein, those skilled in the art can readily devise many other varied embodiments that still incorporate these teachings.

We claim:

1. In apparatus having a packet network comprised of successive stages of cross-point switches which collectively inter-connect a plurality of nodes external to said network, wherein a packet is carried between two of said nodes and over a prescribed route through said network and at least one of said switches therein, a method for substantially preventing routing deadlocks from occurring within the network, said method comprising the steps of:

first defining a plurality of prescribed routes through said network such that a packet can be carried from individual nodes within said plurality of nodes over different corresponding ones of said routes to every other node within said plurality of nodes, wherein each of said defined routes extends over at least one link, said prescribed routes being defined so as to parse said network into first and second network partitions connected to respectively first and second groups of differing ones of the nodes, such that packets that are to transit between first and second ones of said nodes in the first group and connected solely to the first network partition would not be carried over any route having a link extending into said second network partition; and storing all of said prescribed routes in a resulting route table.

2. The method in claim 1 wherein said first defining step further comprises the step of second defining the plurality of prescribed routes such that packets that are to transit between third and fourth ones of said plurality of nodes correspondingly connected to said first and second network partitions could be carried over a route having at least one link extending between said first and second network partitions.

3. The method in claim 2 further comprising the steps of:
in assembling a packet to be routed in said network from a source node to a destination node, both within said plurality of nodes, accessing the resulting route table to yield a resultant route for said packet;

copying the resultant route into said packet; and routing said packet over said resultant route through the network.

4. The method in claim 3 further comprising the step of downloading a different portion of said resulting route table into a separate corresponding local route table associated with each one of said plurality of nodes, each of said resulting route table portions specifying all ones of said prescribed routes with said each one node as a source node; and said resultant route copying step comprises, for a packet that is to emanate from the source node to the destination node, the step of accessing, based upon the destination node for the packet, the local route table for the source node to yield the resultant route.

5. The method in claim 4 wherein each of said packets contains a header having a routing field containing at least one route byte, said routing field collectively specifying a route through which said each packet will take through the network with each individual one of said route bytes defining a route which said each packet will traverse through a corresponding one of said cross-point switches, and wherein the resultant route copying step further comprises the step of copying a value of each successive one of said route bytes in said resultant route into a separate corresponding successive route byte in said header.

6. The method in claim 5 wherein each network partition constitutes a portion of the packet network to which half of all the nodes is connected.

7. The method in claim 5 further comprising the step of operating the apparatus in a service phase and a run phase, and executing the first defining and the prescribed routes storing steps during the service phase and the resultant route accessing, the resultant route copying and packet routing steps during the run phase.

8. The method in claim 5 wherein the first defining step further comprises the steps of:

determining, in response to network devices and interconnection data in a topology file, all available shortest-path routes from each of said nodes, taken as a source node, to every other available one of said nodes, taken as a destination node, but excluding any route, for inclusion within the shortest-path routes, that has a path through one of the devices prohibited by a deadlock avoidance directive for said one device and contained in said topology file;

if one shortest-path route results between said source node and said destination node, writing that one shortest-path route into the resulting route table as the prescribed route between the source node and the destination node;

if more than one shortest-path route results between said source node and said destination node, choosing from among the shortest-path routes the one shortest-path route having collectively a minimum weight associated therewith as the prescribed route between the source node and the destination node; and incrementing a separate corresponding weight, associated with each link in the prescribed route, by a pre-defined amount.

9. The method in claim 8 wherein said routes determining step comprises the step of conducting a breadth-first search to locate said all available shortest-path routes.

10. The method in claim 9 further comprising the step of operating the apparatus in a service phase and a run phase, and executing the first defining and the prescribed routes storing steps during the service phase and the resultant route accessing, the resultant route copying and packet routing steps during the run phase.

11. The method in claim 10 wherein each network partition constitutes a portion of the packet network to which half of all the nodes is connected.

12. In a system having a packet network comprised of successive stages of cross-point switches which collectively inter-connect a plurality of nodes external to said network, wherein a packet is carried over a prescribed route through said network and at least one of said switches therein, apparatus for substantially preventing routing deadlocks from occurring within the network, said apparatus comprising:

first means for defining a plurality of prescribed routes through said network such that a packet can be carried from individual nodes within said plurality of nodes over different corresponding ones of said routes to every other node within said plurality of nodes, wherein each of said defined routes extends over at least one link, said prescribed routes being defined so as to parse said network into first and second network partitions connected to respectively first and second groups of differing ones of the nodes, such that packets that are to transit between first and second ones of said nodes in the first group and connected solely to the first network partition would not be carried over any route having a link extending into said second network partition; and means for storing all of said prescribed routes in a resulting route table.

13. The apparatus in claim 12 wherein said first defining means also defines the plurality of prescribed routes such that packets that are to transit between third and fourth ones of said plurality of nodes correspondingly connected to said first and second network partitions could be carried over a route having at least one link extending between said first and second network partitions.

14. The apparatus in claim 13 further comprising means, during assembly of a packet to be routed in said network from a source node to a destination node, both within said plurality of nodes, for accessing the resulting route table to yield a resultant route for said packet, for copying the resultant route into said packet, and for routing said packet over said resultant route through the network.

15. This apparatus in claim 14 further comprising:

a separate corresponding local route table associated with each one of said plurality of nodes into which a different portion of said resulting route table is downloaded, each of said resulting route table portions specifying all ones of said prescribed routes with said each one node as a source node; and means for accessing, for a packet that is to emanate from the source node to the destination node, based upon the destination node for the packet, the local route table for the source node to yield the resultant route.

16. The apparatus in claim 15 wherein each of said packets contains a header having a routing field containing at least one route byte, said routing field collectively specifying a route through which said each packet will take through the network with each individual one of said route bytes defining a route which said each packet will traverse through a corresponding one of said cross-point switches, and wherein a value of each successive one of said route bytes in said resultant route is copied into a separate corresponding successive route byte in said header.

17. The apparatus in claim 16 wherein each network partition constitutes a portion of the network to which half of all of the nodes is connected.

18. The apparatus in claim 16 wherein the first defining means further comprises:

means for determining, in response to network devices and inter-connection data in a topology file, all available shortest-path routes from each of said nodes, taken as a source node, to every other available one of said nodes, taken as a destination node, but excluding any route, for inclusion within the shortest-path routes, that has a path through one of the devices prohibited by a deadlock avoidance directive for said one device and contained in said topology file;

means, operative if one shortest-path route results between said source node and said destination node, for writing that one shortest-path route into the resulting route table as the prescribed route between the source node and the destination node;

means, operative if more than one shortest-path route results between said source node and said destination node, for choosing from among the shortest-path routes the one shortest-path route having collectively a minimum weight associated therewith as the prescribed route between the source node and the destination node; and means for incrementing a separate corresponding weight associated with each link in the prescribed route, by a pre-defined amount.

19. The apparatus in claim 16 wherein said system is a parallel processing system and each of said nodes comprises a separate processing element.

20. The apparatus in claim 19 wherein said parallel processing system comprises 512 separate processing elements and said switches are organized into 32-port switch boards and said system further comprises a plurality of said switch boards wherein 32 of said switch boards are node switch boards (NSBs) and 16 of said switch boards are intermediate switch boards (ISBs), with said ISBs collectively inter-connecting all of said NSBs such that a corresponding one of 16 ports on each of said NSBs is connected, through a different corresponding link, to the same corresponding port on each one of said NSBs and the remaining 16 ports on each of the NSBs are connected to 16 different successive ones of said processing elements.

* * * * *